Patented Nov. 16, 1926.

1,607,060

UNITED STATES PATENT OFFICE.

CLYDE T. DEAN, OF CHICAGO, ILLINOIS.

GLOSSY WATER-COLOR INK COMPOSITION.

No Drawing.    Application filed March 12, 1923.  Serial No. 624,646.

My invention relates to a glossy water color ink composition, and has for its principal object the provision of a composition for making water color ink which has a permanent gloss and will retain the same, and which is especially adapted for embossing purposes.

Another object is to provide such a composition in the form of a solution for making glossy water color ink, by the simple admixture of the solution with a suitable quantity of ink powder or pigment of the color or shade desired.

Another object is to provide a water color ink used for embossing purposes and which has a permanent gloss.

Other objects will appear hereinafter.

Water color embossing inks on the market at the present time, as well as compositions for making such inks, all produce a flat color, that is, they fail to produce the much desired permanent gloss when put in use. I provide a water color ink, especially suitable for embossing purposes, which has and will permanently retain a bright gloss; and I furthermore place a composition on the market from which such ink can be made by the purchaser by the simple mixing in this solution of a suitable quantity of ink pigment of the desired color or shade.

My composition consists preferably of the following ingredients, and in substantially the following proportions:

Gum arabic 25 lbs.; liquid soap, 1 gallon; starch, gloss or laundry, 20 lbs.; dextrine, preferably canary colored or potato dextrine, 100 lbs.; water, 10 gallons; oil of anise, ½ pt.; "Lysol," or pine tar or coal tar, ½ pt.; glucose, preferably in the liquid form, 40 lbs.

The dextrine is preferably canary colored dextrine derived from potatoes, but other dextrine may be substituted therefor.

The oil of anise is used to give an agreeable odor and may be dispensed with.

The "Lysol" is used chiefly to prevent the composition from souring, and pine tar or coal tar may be used in place thereof.

The ingredients are all placed together in a kettle or vat and heated to about 400° F., and are cooked for about an hour, whereafter the mixture is allowed to cool gradually, taking about five hours, and is then placed in suitable containers. This mixture or composition is in the form of a thick liquid or solution and of a very light color, somewhat similar to ordinary mucilage in form and appearance, and in view of its light color it will not change the color or shade of the ink pigment mixed therewith.

The composition is sold in this form with instructions to mix four pounds of ink powder or pigment of the desired color in one gallon of the solution. And, where preferred, the complete ink, prepared in the above manner, is offered for sale in the desired colors or shades and in suitable quantities.

The composition will remain in solution without forming any settlement and will retain its consistency for a number of years.

While I have set forth in detail the preferred ingredients and proportions of my compound these are capable of some variations without departing from the spirit of the invention. I, therefore, do not wish to be limited to the precise ingredients and proportions set forth, but desire to avail myself of such variations and modifications as fall within the scope of the appended claims.

Having described my invention what I claim as new and desire to secure by Letters Patent is:

1. A composition of the class described comprising gum arabic soap, starch, dextrine, a tar product adapted to prevent the mixture from souring, glucose, and water, substantially as described.

2. A composition of the kind described, comprising the following ingredients in substantially the following proportions: gum arabic, 25 lbs.; liquid soap, 1 gallon; starch, 20 lbs.; dextrine, 100 lbs.; water, 10 gallons; "Lysol", ½ pint; and glucose, 40 lbs.

3. A composition of the kind described, comprising the following ingredients in substantially the following proportions; gum arabic, 25 lbs.; liquid soap, 1 gallon; gloss starch, 20 lbs.; dextrine, 100 lbs.; water, 10 gallons; oil of anise, ½ pint; "Lysol," ½ pint; and glucose, 40 lbs.

4. A composition for mixing with powdered ink pigments to prepare a glossy water color ink, said composition consisting of the following ingredients in substantially the following proportions; gum arabic, 25 lbs.; liquid soap, 1 gallon; starch, 20 lbs.; dextrine, 100 lbs.; water, 10 gallons; a tar product, to prevent souring, ½ pint; and liquid glucose, 40 lbs.

5. A glossy ink comprising gum arabic, liquid soap, starch, dextrine, a tar product, to prevent souring, glucose, and ink pigment, substantially in the proportions described.

6. An embossing ink with a permanent gloss comprising the following ingredients in substantially the following proportions: gum arabic, 25 lbs.; liquid soap, 1 gallon; starch, 20 lbs.; dextrine, 100 lbs.; water, 10 gallons; oil of anise, ½ pint; a tar product, to prevent souring, ½ pint; glucose, 40 lbs.; and ink powder, 60 lbs.

7. A method of making a solution used for preparing glossy water color ink, which method comprises the mixing together of gum arabic, liquid soap, starch, dextrine, water, a tar product, like "Lysol", and glucose; heating said mixture to about 400° F., and boiling it for about one hour, then letting it cool gradually.

8. A method of making a solution for preparing glossy water color embossing ink, which method comprises mixing together gum arabic, 25 lbs.; liquid soap, 1 gallon; starch, 20 lbs.; dextrine, 100 lbs.; water, 10 gallons; oil of anise, ½ pint; "Lysol", ½ pint; and glucose, 40 lbs.; heating said mixture to about 400° F. and boiling it for about 1 hour, then letting it cool gradually in the air.

9. The method of preparing a water color ink with a permanent gloss, which comprises mixing together gum arabic, 25 lbs; liquid soap, 1 gal.; starch, 20 lbs.; dextrine, 100 lbs.; water 10 gal.; a substance to prevent souring, like "Lysol," ½ pt.; and glucose, 40 lbs.; boiling said mixture for substantially an hour; cooling it gradually; and mixing with it sufficient ink powder to form ink of suitable consistency.

10. The method of preparing a water color embossing ink having a permanent gloss, which consists in mixing together gum arabic, 25 lbs.; liquid soap, 1 gallon; starch, 20 lbs.; dextrine, 100 lbs.; water, 10 gallons; oil of anise, ½ pint; "Lysol", ½ pint; and glucose, 40 lbs.; heating this mixture to about 400° F., and boiling it for an hour; then allowing the mixture to cool gradually; then mixing with it substantially 60 lbs. of powdered ink to form a suitable embossing ink.

11. A composition for making a glossy water color embossing ink, said composition comprising gum arabic, soap, starch, dextrine, a tar product adapted to prevent the mixture from souring, glucose, water, and a substance to give an agreeable odor.

12. A composition adapted to be mixed with ink powder for making a water color ink with a permanent gloss, said composition comprising gum arabic, liquid soap, starch, dextrine, water, a substance like "Lysol" to prevent souring, and glucose.

In testimony whereof I have signed my name to this specification.

CLYDE T. DEAN.